United States Patent [19]

Skeie

[11] Patent Number: 4,604,623
[45] Date of Patent: Aug. 5, 1986

[54] SURFACE ACOUSTIC WAVE PASSIVE TRANSPONDER HAVING NON-REFLECTIVE TRANSDUCERS AND PADS

[75] Inventor: Halvor Skeie, San Jose, Calif.

[73] Assignee: X-Cyte Inc., Mountain View, Calif.

[21] Appl. No.: 509,524

[22] Filed: Jun. 30, 1983

[51] Int. Cl.⁴ ............................................. G01S 13/74
[52] U.S. Cl. ............................... 343/6.8 R; 310/313 B; 333/151
[58] Field of Search ......... 343/6.5 SS, 6.8 R, 6.8 LC; 310/313 R, 313 B, 313 D; 333/150–155, 193–196

[56] References Cited

U.S. PATENT DOCUMENTS

| | | | |
|---|---|---|---|
| 3,273,146 | 9/1966 | Hurowitz, Jr. | 343/6.8 R |
| 3,706,094 | 12/1972 | Cole et al. | 343/6.8 R X |
| 3,755,803 | 8/1973 | Cole et al. | 343/6.8 R X |
| 3,810,257 | 5/1974 | Jones et al. | 310/313 B X |
| 4,058,217 | 11/1977 | Vaughan et al. | 209/559 |
| 4,059,831 | 11/1977 | Epstein | 343/6.8 R |
| 4,143,340 | 3/1979 | Hunsinger | 333/194 X |
| 4,201,964 | 5/1980 | Noro et al. | 333/194 X |
| 4,263,595 | 4/1981 | Vogel | 343/65 SS |
| 4,267,534 | 5/1981 | Tanski | 333/194 X |

FOREIGN PATENT DOCUMENTS

| | | | |
|---|---|---|---|
| 8002485 | 11/1980 | Japan | 333/194 |
| 0122215 | 9/1981 | Japan | 333/194 |
| 0153817 | 11/1981 | Japan | 333/194 |

Primary Examiner—T. H. Tubbesing
Assistant Examiner—Gilberto Barrón, Jr.
Attorney, Agent, or Firm—Karl F. Milde, Jr.

[57] ABSTRACT

A passive transponder for use in an interrogation/transponder system comprises a substrate having a substrate surface defining a path of travel for surface acoustic waves; a launch transducer element arranged on the surface for converting interrogating signals into surface acoustic waves which propagate along the path of travel; a plurality of tap transducer elements arranged on the surface at spaced intervals along the path of travel for converting surface acoustic waves into respective output signals; and a circuit, connected to the tap transducer elements, for combining the output signals of these transducer elements to form reply signals. In order to minimize reflections from the edges of the transducer elements, these elements are configured with serrated edges facing the path of travel.

8 Claims, 10 Drawing Figures

SURFACE ACOUSTIC WAVE PASSIVE TRANSPONDER HAVING NON-REFLECTIVE TRANSDUCERS AND PADS

CROSS REFERENCE TO RELATED APPLICATIONS

The present application is related in subject matter to the following commonly owned application for patent:

Application Ser. No. 509,523, filed June 30, 1983, for "System for Interrogating A Passive Transponder Carrying Amplitude and/or Phase Encoded Information" of P. Nysen, H. Skeie and D. Armstrong;

Application Ser. No. 509,522, filed June 30, 1983, for "Apparatus For Compensating Non-Linearities In A Frequency-Modulated Signal" of P. Nysen;

Application Ser. No. 509,521, filed June 30, 1983, for "Surface Acoustic Wave Passive Transponder Having Optimally-Sized Transducers" of H. Skeie;

Application Ser. No. 509,525, filed June 30, 1983, for "Surface Acoustic Wave Transponder Having Parallel Acoustic Wave Paths" of H. Skeie;

Application Ser. No. 509,526, filed June 30, 1983, for "Surface Acoustic Wave Passive Transponder Having Amplitude and Phase Modifying Surface Pads" of H. Skeie;

Application Ser. No. 509,527, filed June 30, 1983, for "Surface Acoustic Wave Passive Transponder Having Acoustic Wave Reflectors" of H. Skeie and P. Nysen;

BACKGROUND OF THE INVENTION

The present invention relates to a "passive interrogator label system" (PILS); that is a system comprising an interrogator for transmitting an interrogation signal, one or more "labels" or passive transponders which produce a reply signal containing coded information in response to the Interrogation signal, and a receiver and decoding system for receiving the reply signal and decoding the information contained therein.

A passive interrogator label system of the type to which the present invention relates is disclosed in the U.S. Pat. No. 3,273,146 to Horwitz, Jr.; U.S. Pat. No. 3,706,094 to Cole and Vaughan; U.S. Pat. No. 3,755,803 to Cole and Vaughan; and U.S. Pat. No. 4,058,217 to Vaughan and Cole. In its simplest form, the systems disclosed in these patents include a radio frequency transmitter capable of transmitting RF pulses of electromagnetic energy. These pulses are received at the antenna of a passive transponder and applied to a piezoelectric "launch" transducer adapted to convert the electrical energy received from the antenna into acoustic wave energy in the piezoelectric material. Upon receipt of a pulse, an acoustic wave is generated within the piezoelectric material and transmitted along a defined acoustic path. Further "tap" transducers arranged at prescribed, spaced intervals along this path convert the acoustic wave back into electric energy for reconversion into electrical energy by the launch transducer. The presence or absence of tap transducers at the prescribed locations along the acoustic wave path determines whether a reply pulse will be transmitted with a particular time delay, in response to an interrogation pulse. This determines the informational code contained in the transponder reply.

When an acoustic wave pulse is reconverted into an electrical signal it is supplied to an antenna on the transponder and transmitted as RF electromagnetic energy. This energy is received at a receiver and decoder, preferably at the same location as the interrogating transmitter, and the information contained in this response to an interrogation is decoded.

In the patent application Ser. No. 509,523, filed June 30, 1983, for "System for Interrogating a Passive Transponder Carrying Amplitude and/or Phase Encoded Information" of P. Nysen, H. Skeie, and D. Armstrong, it is proposed to provide an interrogator for transmitting a first, interrogation signal having a first frequency which successively assumes a plurality of frequency values within a prescribed frequency range. This first frequency may, for example, be in the range of 905 to 925 MHz, a frequency band which is freely available in many parts of the world for short range transmission.

The remote, passive transponder associated with this interrogator receives the first signal as an input, and produces a second, reply signal as an output. Signal transforming means within the transponder convert the first signal in such a way as to impart a known informational code in the second signal which is associated with and identifies the particular passive transponder.

Associated with the interrogator of the system is a receiver for receiving the second signal from the passive transponder and a mixer, arranged to receive both the first signal and the second signal, or signals derived therefrom, for mixing together these two signals and thereby producing a further signal. This further signal may, for example, contain the sum and the difference frequencies of the first and the second signals, respectively.

Finally, the proposed system includes a signal processor responsive to the signal produced by the mixer for detecting the frequencies contained in this signal to thereby determine the informational code associated with the passive transponder.

In systems of this general type, considerable surface acoustic wave energy is lost because it is reflected from launch and tap transducers instead of travelling beneath these transducers for conversion into an electrical signal. Furthermore, reflections from one transducer element is received and converted into an electrical signal at another transducer element, causing unwanted noise in the transponder reply.

SUMMARY OF THE INVENTION

It is an object of the present invention to provide a passive transponder adapted for use in an interrogation system for transmitting a reply signal containing encoded information in response to the receipt of an interrogating signal.

It is another object of the present invention to provide a passive transponder of the above-noted type which comprises a substrate having a substrate surface defining a path of travel for surface acoustic waves; a launch transducer element arranged on the surface for converting the interrogating signal into a surface acoustic wave which propagates along the path of travel; a plurality of tap transducer elements arranged on the surface at spaced intervals along the path of travel for converting a surface acoustics wave into respective output signals; and a circuit, connected to the tap transducer elements, for combining the output signals of these transducer elements to form a reply signal.

It is a further object of the present invention to provide a passive transponder of the above-noted type in which reflections from the transducer elements are minimized.

These objects as well as further objects which will become apparent from the discussion that follows, are achieved, according to the present invention, by configuring the transducer elements to have a serrated edge on a side thereof facing the path of travel so as to reduce the acoustic wave reflections from this edge.

In a preferred embodiment of the present invention, at least one surface acoustic wave delay pad element is also disposed on the substrate along the path of travel to control the surface acoustic wave propagation time. In order to reduce acoustic wave reflections from such a delay pad element, the element has a serrated edge on a side thereof facing the path of travel.

The serrated edges referred to above on both the transducer elements and the delay pad elements may be provided on one side of each element or on both sides. Preferably, the width of the serration in each serrated edge in the direction of the path of travel is $n\lambda/4$, where n is an odd integer and $\lambda$ is the center wavelength of the surface acoustic wave. Thus, the serrated edge will have a depth of $1/4\lambda$, $3/4\lambda$, $5/4\lambda$, etc., so as to provide 180° phase difference between the inner and outer surfaces of the serrated edge at the center carrier frequency of the surface acoustic wave.

For a full understanding of the present invention, reference should now be made to the following detailed description of the preferred embodiments of the invention and to the accompanying drawings.

DESCRIPTION OF THE PREFERRED EMBODIMENTS

Figure 1:
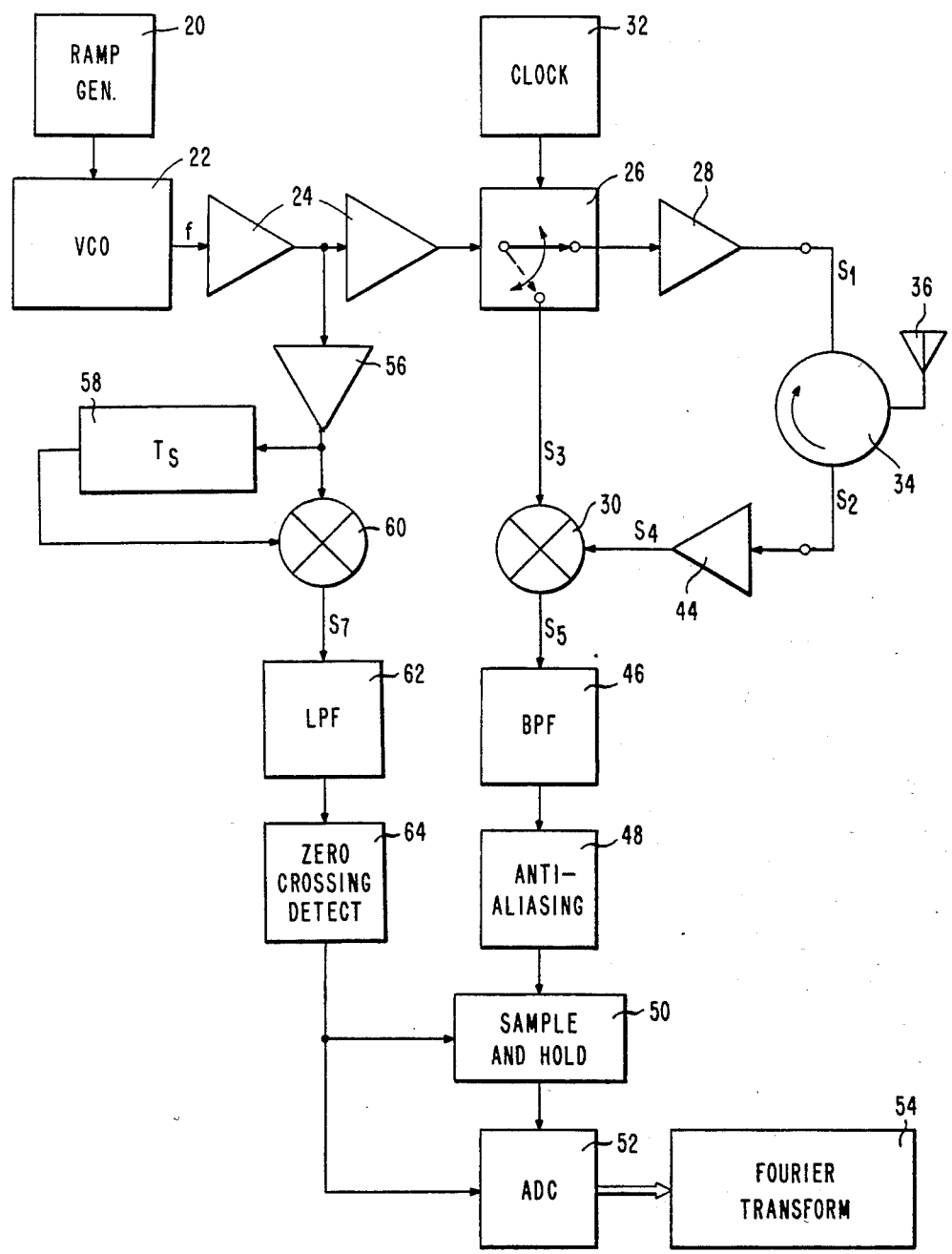
FIG. 1 is a block diagram of a system for transmitting an interrogation signal, receiving a reply signal and decoding information encoded in the reply signal.

The present invention will now be described with reference to FIGS. 1–10 of the drawings. Identical elements in the various figures are designated by the same reference numerals.

FIGS. 1–7 illustrate an interrogator-transponder system employing a surface acoustic wave transponder which may form the environment of the present invention. A system of this general type is disclosed in the U.S. Pat. No. 3,706,094 to Cole and Vaughn. This particular system is described in detail in the commonly-owned patent application Ser. No. 509,523, filed June 30, 1083, for "System for Interrogating a Passive Transponder Carrying Amplitude and/or Phase-Encoded Information" of P. Nysen, H. Skeie and D. Armstrong.

The transmitter/receiver and decoder system shown in FIG. 1 comprises a ramp generator 20 which supplies a sawtooth waveform to a voltage controlled oscillater (VCO) 22. The VCO produces an output signal of frequency f which repeatedly ramps linearly upward from a frequency of 905 MHz to a frequency of 925 MHz. This signal is amplified by the RF amplifiers 24 and supplied to a transmit/receive switch 26. The switch 26 directs the signal either to a transmitter power amplifier 28 or to a decoding mixer 30. The switch 26 is controlled by an 100 KHz square wave signal produced by a clock 32. The output signal $S_1$ from the amplifier 28 is supplied to an external circulator 34 or transmit/receive (IR) switch and is transmitted as electromagnetic radiation by an antenna 36.

Figure 2:
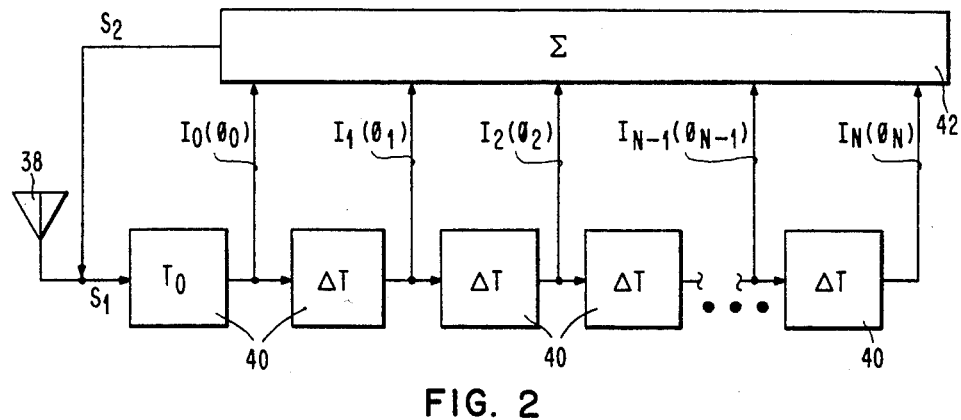
FIG. 2 is a block diagram of a passive transponder adapted for use with the system of FIG. 1.

A block diagram of the transponder associated with the system of FIG. 1 shown in FIG. 2. The transponder receives the signal $S_1$ at an antenna 38 and passes it to a series of delay elements 40 having the indicated delay periods $T_O$ and $\Delta T$. After passing each successive delay, a portion of the signal $I_0, I_1, I_2 \ldots I_N$ is tapped off and supplied to a summing element 111. The resulting signal $S_2$, which is the sum of the intermediate signals $I_O \ldots I_N$, is fed back to the antenna 38 for transmission to the antenna 36 in the system of FIG. 1.

The transponder reply signal $S_2$ is received by the antenna 36 and passed through the circulator or TR switch 34 to a receiver amplifier 44. The output $S_4$ of this amplifier 44 is heterodyned in the mixer with the signal $S_3$ intermittently presented by the switch 26.

The output $S_5$ of the mixer 30 contains the sum and the difference frequencies of the signals $S_3$ and $S_4$. This output is supplied to a band pass filter 46 with a pass band between 1 and 3 KHz. The output of this filter is passed through an anti-aliasing filter 48 to a sample-and-hold circuit 50.

The sample-and-hold device supplies each sample to an analog-to-digital converter 52. The A/D converter, in turn, presents the digital value of this sample to a processor 54 that analyzes the frequencies contained in the signal by means of a Fourier transform. The sample-and-hold device 50 and the A/D converter 52 are strobed by a sampling signal which serves to compensate for the non-linearity, with respect to time, in the monotonically increasing frequency f of the VCO output signal.

To effect compensation the signal of frequency f produced by the VCO 22 is passed via an isolating amplifier 56 to a delay element 58 with a constant signal delay $T_s$. Both the delayed and the undelayed signals are supplied to a mixer 60 which produces a signal $S_7$ containing both sum and difference frequencies. The signal $S_7$ is supplied to a low-pass filter 62 which passes only the portion of this signal containing the difference frequencies. The output of the low-pass filter is supplied to a zero-crossing detector 64 which produces a pulse at each positive (or negative) going zero crossing. These pulses are used to strobe the sample-and-hold device 50 and the A/D converter 52.

Figure 3:
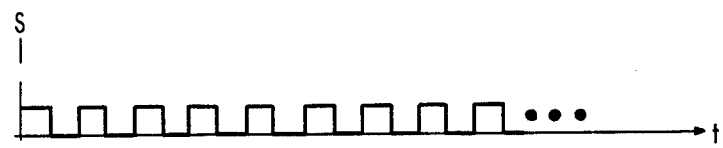
FIG. 3 is a timing diagram indicating the clock output in the system of FIG. 1.
Figure 4:
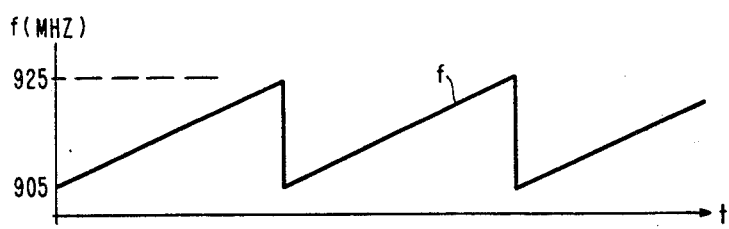
FIG. 4 is a frequency vs. time diagram illustrating the transmitted signal in the system of FIG. 1.
Figure 5:
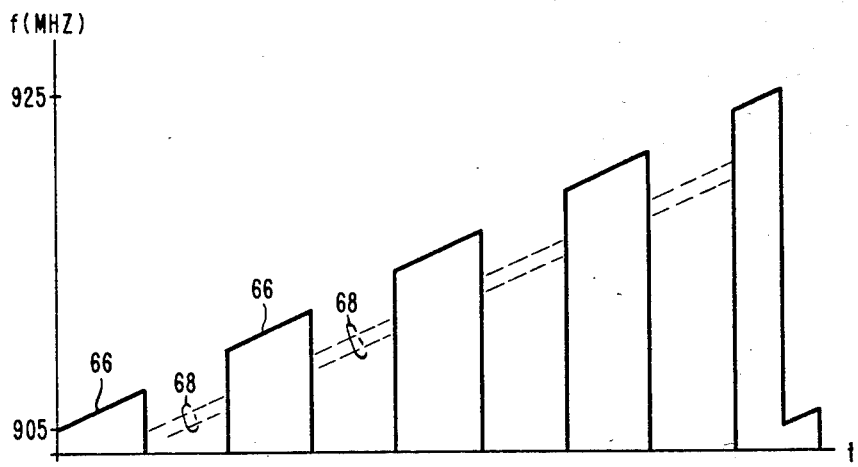
FIG. 5 is a frequency vs. time diagram illustrating both the transmitted and the received signal in the system of FIG. 1.

FIGS. 3–5 illustrate the operation of the circuit of FIG. 1. FIG. 3 shows the 100 KHz output of the clock 32; FIG. 4 shows the frequency sweep of the signal produced by the VCO 22. FIG. 5 shows, in solid lines 66, the frequency of the transmitted signal $S_1$ and, in dashed lines 68, the frequency of the signal $S_2$ as received from the transponder. As may be seen, the signal 68 is received during the interval between transmissions of the signal 66. These intervals are chosen to equal, approximately, the round trip delay time between the transmission of a signal to the transponder and the receipt of the transponder reply. As indicated by the mutliple dashed lines. The transponder reply will contain a number of frequencies at any given instant of time as a result of the combined (i.e., summed) intermediate signals having different delay times ($T_0$, $T_0+\Delta T$, $T_0+2\Delta T$, ... $T_0+N\Delta T$).

Figure 6:
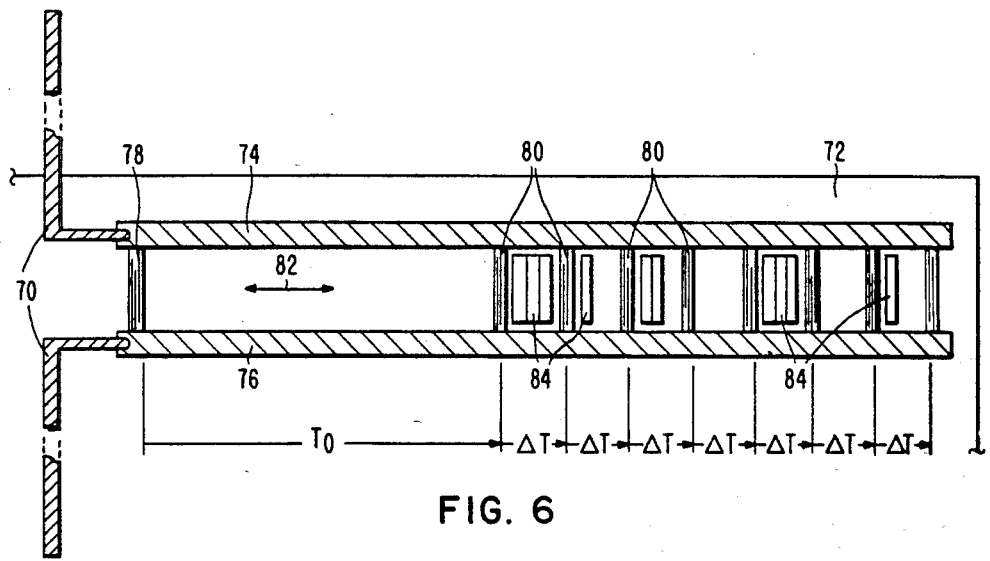
FIG. 6 is a plan view, in enlarged scale, of a particular implementation of the transponder of FIG. 2.
Figure 7:
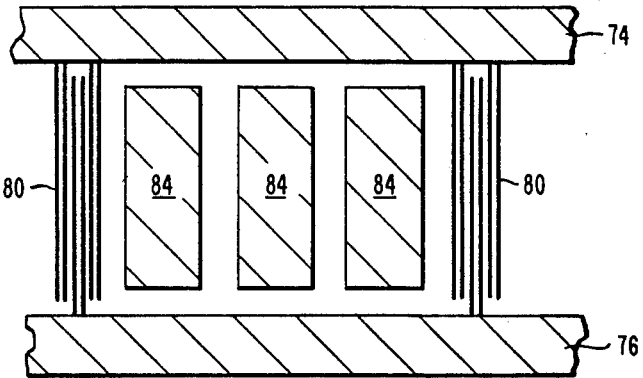
FIG. 7 is a plan view, in greatly enlarged scale, of a portion of the implementation shown in FIG. 6.

FIGS. 6 and 7 illustrate an embodiment of a passive transponder which implements the block diagram of FIG. 2. This transponder operates to convert the received signal $S_1$ into an acoustic wave and then to reconvert the acoustic energy back into an electrical signal $S_2$ for transmission via a dipole antenna 70. More particularly, the signal transforming element of the transponder includes a substrate 72 of piezoelectric material such as a lithium niobate ($LiNbO_3$) crystal. On the surface of this substrate is deposited a layer of metal, such as aluminum, forming a pattern such as that shown in detail in FIG. 7. For example, this pattern may consist of two bus bars 74 and 76 connected to the dipole antenna 70, a "launch" transducer 78 and a plurality of "tap" transducers 80. The bars 74 and 76 thus define a path of travel 82 for a surface acoustic wave which is generated by the launch transducer and propogates substantially linearly, reaching the tap transducers each in turn. The tap transducers convert the surface acoustic wave back into electrical energy which is collected and therefore summed by the bus bars 74 and 76. This electrical energy then activates the dipole antenna 70 and is converted into electromagnetic radiation for transmission as the signal $S_2$.

The tap transducers 80 are provided at equally spaced intervals along the surface acoustic wave path 82, as shown in FIG. 6, and an informational code associated with the transponder is imparted by providing a selected number of "delay pads" 84 between the tap transducers. These delay pads, which are shown in detail in FIG. 7, are preferably made of the same material as, and deposited with, the bus bars 74, 76 and the transducers 78, 80. Each delay pad has a width sufficient to delay the propagation of the surface acoustic wave from one tap transducer 80 to the next by one quarter cycle or 90° with respect to an undelayed wave at the frequency of operation (circa 915 MHz). By providing locations for three delay pads between successive tap transducers, the phase $\phi$ of the surface acoustic wave received by a tap transducer may be controlled to provide four phase possibilities:

1. No pad between successive tap transducers = $-90°$;
2. One pad between successive tap transducers = $0°$;
3. Two pads between successive tap transducers = $+90°$
4. Three pads between successive tap transducers = $+180°$.

Referring to FIG. 2 the phase information $\phi_0$ (the phase of the signal picked up by the first tap transducer in line), and $\phi_1$, $\phi_2$ ... $\phi_N$ (the phases of the signals picked up by the successive tap transducers) is supplied to the combiner (summer) which in the embodiment of FIG. 6 comprises the bus bars 74 and 76. This phase information, which is transmitted as the signal $S_2$ by the antenna 70, contains the informational code of the transponder.

Although the system described above works well when the number of tap transducers is kept to a minimum (e.g., 4) surface acoustic wave reflections from the launch and tap transducers as well as from the delay pads reduce the amount of acoustic wave energy actually received and converted to an electrical signal by the transducers and also introduces unwanted, spurious signals into the transponder reply. Specifically, a surface acoustic wave generated by the launch transducer 78 may propogate toward the tap transducers and then be partially reflected back by one or more of the tap transducers. These reflections therefore draw off some of the energy contained in the original acoustic wave, thereby reducing the strength of the reply signal upon reconversion of this original acoustic wave back into an electrical signal. Furthermore, the reflected energy is partially picked up by both the laumch and the tap transducers adding spurious signals to the transponder reply. Although these effects of reflection cause no difficulty when only a few tap transducers are provided on the piezoelectric substrate, the effects become disturbing as the number of tap transducers is increased.

Figure 8:
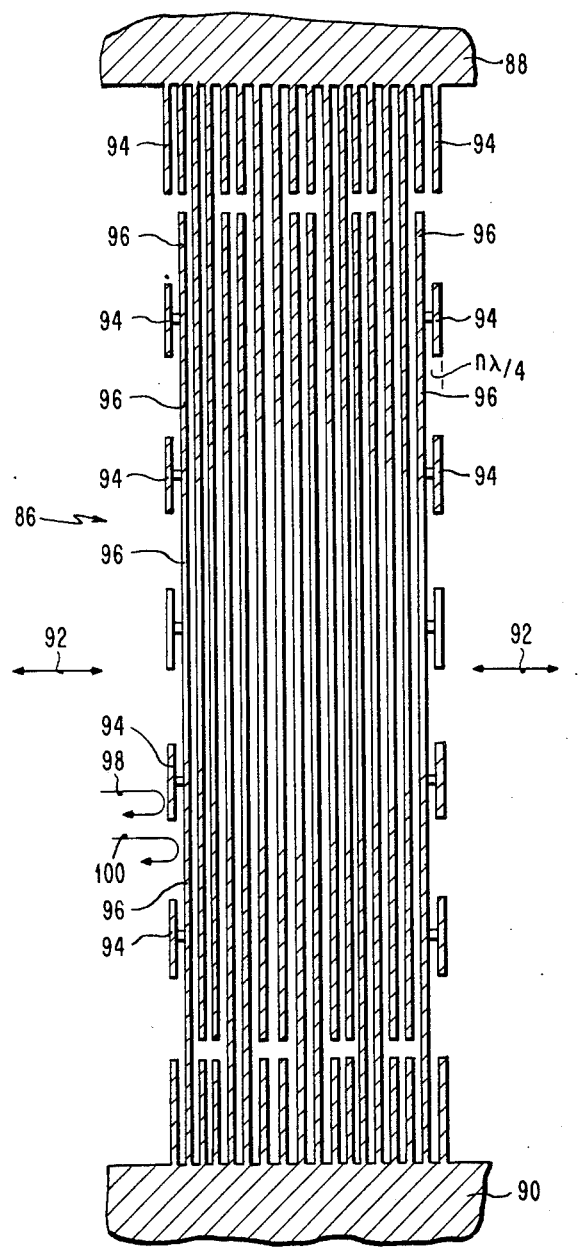
FIG. 8 is a plan view, in greatly enlarged scale, of a transducer element having non-reflective, serrated edges on both sides according to a preferred embodiment of the present invention.

FIG. 8 illustrates a typical transducer (either launch or tap transducer) which has serrated edges according to the invention for reducing reflections of surface acoustic waves. As may be seen, this transducer comprises an interdigital electrode assembly 86 formed of individual electrode fingers arranged between and connected to the two bus bars 88 and 90. In the illustrated pattern, half the fingers are connected to the bus bar 88 and the other half are connected to the bus bar 90. Each electrode is connected to one or the other bus bar and extends toward a free end in the direction of the other bus bar.

It will be appreciated that the size of the transducer is expandable at will by merely adding electrode fingers in the same pattern shown. The size of the transducer is thus determined by the number of fingers arranged in parallel.

As is illustrated in FIG. 8, both edges of the transducer which are perpendicular to the path of travel 92 of the surface acoustic wave have "T" shaped serrations which serve to minimize acoustic wave reflections from these edges. The serrated edges form surfaces 94 which extend outward in the direction of the acoustic wave path of travel from the transducer and parallel, second edge surfaces 96 which are recessed in the direction of the acoustic wave path of travel with respect to the edge surfaces 94. The width of the serrations—that is, the distance in the direction of the path of travel between the surfaces 94 and the surfaces 96—is preferably substantially equal to $n\lambda/4$ where n is an odd integer and $\lambda$ is the center wavelength of the surface acoustic wave. With this condition, we see that a wave front 100 reflected from the edge surface 96 must travel a distance $2n\lambda/4$ farther than the same wave front 98 which is reflected from the edge surface 94. At the point where the reflected wave fronts 98 and 100 meet, therefore, the wave front 100 will be displaced by $\lambda/2$ or 180° in phase with respect to the wave front 98. The surface acoustic waves reflected from the surfaces 94 and 96 will therefore substantially cancel each other so that little or no surface acoustic wave energy is propagated away from the edges 94 and 96 as reflected waves.

Figure 9:
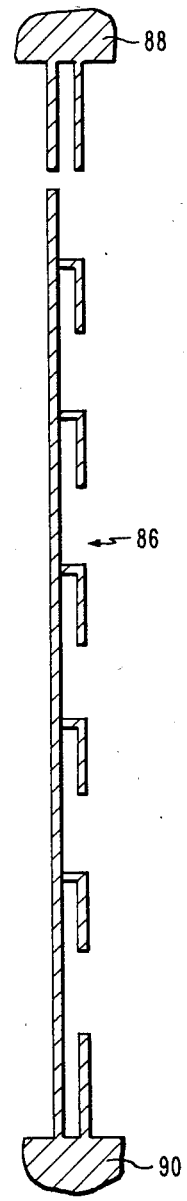
FIG. 9 is a plan view, in greatly enlarged scale, of one edge of a transducer element with a non-reflective serrated edge according to an alternative embodiement of the present invention.

Whereas FIG. 8 shows the serrated edges formed with a "T" shape, FIG. 9 shows similar serrations on one side of a transducer which are "L" shaped. These serrations act in a same manner as the T-shaped serrations of FIG. 8. It is necessary only to insure that the edges have a sufficient number of serrations so that the surface acoustic wave is substantially cancelled in an even manner across its wave front.

Figure 10:
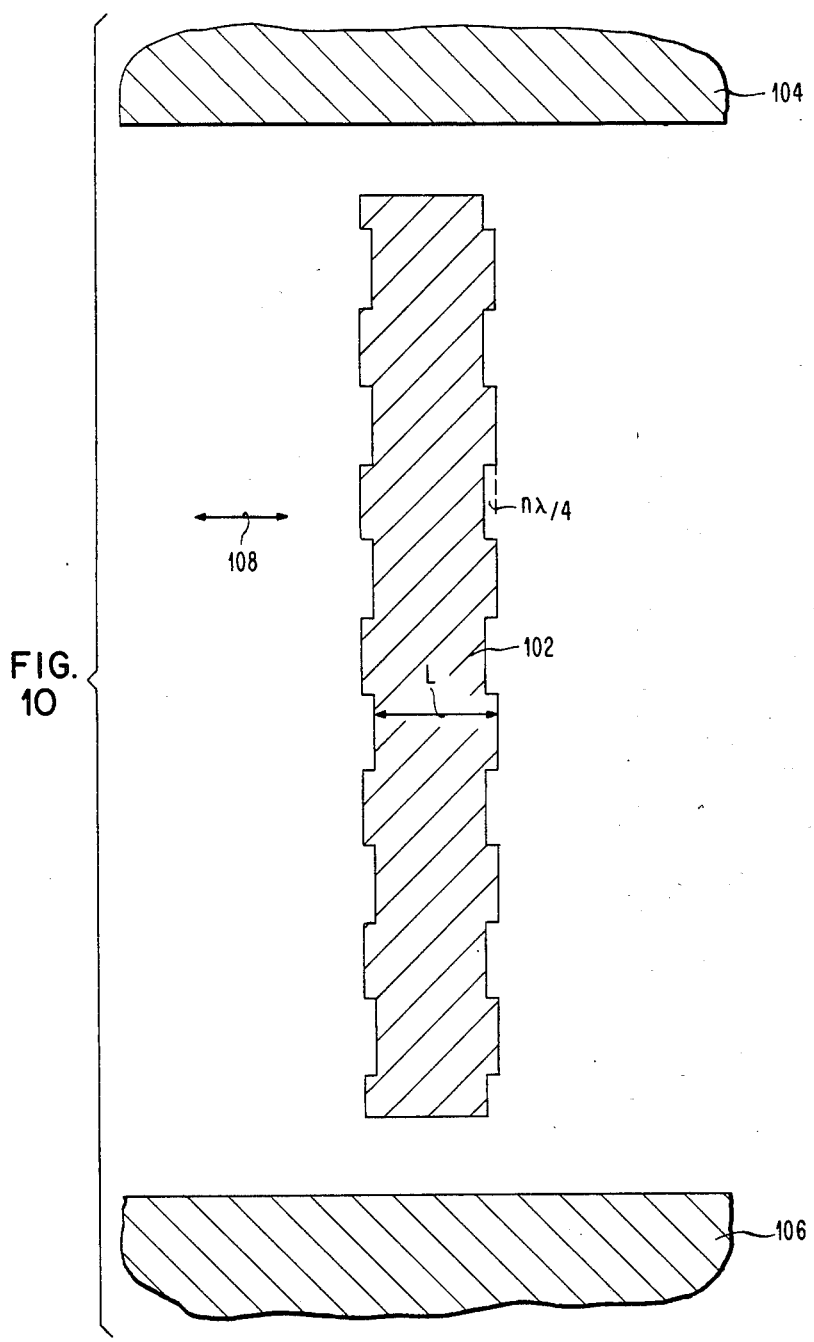
FIG. 10 is a plan view, in greatly enlarged scale of a delay pad element having serrated edges on both sides according to a preferred embodiment of the present invention.

FIG. 10 illustrates a delay pad 102 arranged between bus bars 104 and 106 and having serrated edges on the sides thereof facing the path of travel 108 of surface acoustic waves. As in the embodiment of FIG. 8, the width of the serrations in the direction of the path of travel is equal to $n\lambda/4$. The width L of the delay pad itself, which determines the phase delay (e.g., 90°) is preferably measured from the internal edge of the serration on one side to the external edge of the serration on the opposite side of the delay pad.

There has thus been shown and described a novel surface acoustic wave passive transponder, having non-reflective transducers and pads, which fulfills all the objects and advantages sought therefor. Many changes, modifications, variations and other uses and applications of the subject invention will, however, become apparent to those skilled in the art after considering this specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. In a passive transponder adapted for use in an interrogation system for transmitting a reply signal containing coded information in response to the receipt of an interrogating signal, said transponder comprising:
   (a) a substrate having a substrate surface defining a plurality of paths of travel for surface acoustic waves, each path of travel having a different length from its beginning to its end; and
   (b) electric circuit means for propagating surface acoustic waves along said paths of travel, from said beginning of each path to said end thereof, said electric circuit means comprising a plurality of metallized layer elements, disposed on said substrate and arranged in said paths of travel;
   the improvement wherein at least one of said layer elements has a substantially linear serrated edge on a side thereof facing a path of travel to reduce acoustic wave reflections from said edge, the width of the serration in said serrated edge in the direction of said path of travel being substantially equal to $n\lambda/4$, where n is an odd integer and $\lambda$ is the center wavelength of said surface acoustic waves.

2. In a passive transponder adapted for use in an interrogation system for transmitting a reply signal containing coded information in response to the receipt of an interrogating signal, said transponder comprising:
   (a) a substrate having a substrate surface defining a plurality of paths of travel for surface acoustic waves, each path of travel having a different length from its beginning to its end;
   (b) electric circuit means for propagating surface acoustic waves along said paths of travel, from said beginning of each path to said end thereof; and
   (c) a plurality of surface acoustic wave delay pad elements disposed on said substrate and arranged in said paths of travel to control the surface acoustic wave propagation time;
   the improvement wherein at least one of said delay pad elements has a substantially linear serrated edge on a side thereof facing a path of travel to reduce acoustic wave reflections from said edge, the width of the serration in said serrated edge in the direction of said path of travel being substantially equal to $n\lambda/4$, where n is an odd integer and $\lambda$ is the center wavelength of said surface acoustic waves.

3. The improvement defined in either claim 1 or claim 2, wherein a serrated edge is provided on both sides of said element.

4. The improvement defined in claim 1 or claim 2, wherein a serrated edge is provided on all of said elements arranged in said paths of travel.

5. The improvement defined in claim 2, wherein the serrations of said serrated edge are rectangular in shape.

6. The improvement defined in claim 1 wherein the serrations of said serrated edge are "T" shaped.

7. The improvement defined in claim 1, wherein the serrations of said serrated edge are "L" shaped.

8. The improvement defined in claim 1, wherein said one layer element having a serrated edge is a tap transducer.

* * * * *